(12) United States Patent
Johannsen

(10) Patent No.: US 12,196,549 B2
(45) Date of Patent: Jan. 14, 2025

(54) DETERMINING IDLER WEAR BASED ON POSITION OF IDLER ASSEMBLY

(71) Applicant: Caterpillar Inc., Peoria, IL (US)

(72) Inventor: Eric J. Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 125 days.

(21) Appl. No.: 18/069,673

(22) Filed: Dec. 21, 2022

(65) Prior Publication Data
US 2024/0210155 A1 Jun. 27, 2024

(51) Int. Cl.
*E02F 9/26* (2006.01)
*B62D 55/14* (2006.01)
*B62D 55/32* (2006.01)
*G01B 7/06* (2006.01)
*E02F 9/02* (2006.01)
*G07C 5/00* (2006.01)

(52) U.S. Cl.
CPC ............. *G01B 7/10* (2013.01); *B62D 55/145* (2013.01); *B62D 55/32* (2013.01); *E02F 9/026* (2013.01); *E02F 9/267* (2013.01); *E02F 9/268* (2013.01); *G07C 5/006* (2013.01)

(58) Field of Classification Search
CPC .. E02F 9/26; E02F 9/267; E02F 9/268; G07C 5/006
See application file for complete search history.

(56) References Cited

U.S. PATENT DOCUMENTS

| | | | |
|---|---|---|---|
| 6,305,763 B1 | 10/2001 | Oertley | |
| 9,169,623 B2 | 10/2015 | Robinsky | |
| 9,475,526 B2 | 10/2016 | Mckinley et al. | |
| 9,592,866 B2 | 3/2017 | Hasselbusch et al. | |
| 9,868,482 B2 | 1/2018 | Rust et al. | |
| 10,358,178 B2 | 7/2019 | Yoon et al. | |
| 10,696,337 B2 | 6/2020 | Hawkins et al. | |
| 2013/0255354 A1* | 10/2013 | Hawkins | G01N 3/56 305/15 |
| 2014/0324301 A1* | 10/2014 | Rebinsky | B62D 55/14 701/33.9 |
| 2016/0129954 A1* | 5/2016 | Hasselbusch | G01M 17/03 305/15 |
| 2022/0055699 A1 | 2/2022 | Desmarais et al. | |

FOREIGN PATENT DOCUMENTS

WO    2021255116 A1   12/2021

* cited by examiner

*Primary Examiner* — Benyam Haile

(57) ABSTRACT

In some implementations, a controller may receive, from a sensor system of the machine, sensor data indicating a movement of an idler block of an idler assembly of an undercarriage of the machine. The controller may determine, based on the sensor data, that the idler block has moved from a first position to a second position. The controller may determine an amount of wear of an idler of the idler assembly based on the idler block moving from the first position to the second position. The controller may determine whether the amount of wear satisfies a wear threshold. The controller may cause the machine to perform an action based on determining whether the amount of wear satisfies the wear threshold.

20 Claims, 6 Drawing Sheets

DETERMINING IDLER WEAR BASED ON POSITION OF IDLER ASSEMBLY

TECHNICAL FIELD

The present disclosure relates generally to determining wear of an idler assembly and, for example, to determining wear of an idler based on a position of an idler block.

BACKGROUND

Track links, of an undercarriage assembly of a work machine, are subject to an amount of tension. Typically, as an idler (of the undercarriage assembly) experiences wear, the amount of tension decreases. The decrease in the amount of tension causes the undercarriage assembly and the work machine to operate in an undesired manner. Accordingly, as the idler experiences wear, an idler block of an idler assembly is moved to maintain the amount of tension at an operating level.

One technique for detecting wear of the idler includes obtaining manual measurements of dimensions of the idler. Obtaining manual measurements is a time-consuming process. Additionally, obtaining manual measurements is an expensive process (e.g., due to the cost of measuring tools and devices).

Moreover, manual measurements may be inaccurate. Inaccurate measurements may result in incorrect predictions regarding an amount of wear of the idler. As a result of such incorrect predictions, the idler may either fail prematurely or may be repaired or replaced prematurely (e.g., because the idler may not be sufficiently worn to require replacement or repair).

In some situations, due to the challenges associated with manual measurements, an operator may continue to operate the work machine after the idler experiences an amount of wear that may require a replacement of the idler. Operating the machine in this manner may cause damage to the idler, may cause damage to other components of the undercarriage assembly, and may eventually cause damage to the work machine.

U.S. Pat. No. 10,696,337 (the '337 patent) discloses that an undercarriage monitoring device has a roller assembly including a fixed roller component and a bushing. The '337 patent further discloses that an opening is formed within the fixed roller component, that a first sensor is disposed within the opening of the fixed roller component over the bushing, and that a second sensor is disposed within the opening of the fixed roller component over the bushing.

The '337 patent also discloses that the first sensor is configured to sense a first physical characteristic of the bushing and that the second sensor is configured to sense a second physical characteristic of the bushing. The '337 patent additionally discloses that the first sensor is a temperature sensor or a Hall effect sensor. While the '337 patent discloses sensing physical characteristics of the bushing, the '337 patent does not address detecting wear of an idler of an undercarriage assembly.

The sensor system and the controller of the present disclosure solve one or more of the problems set forth above and/or other problems in the art.

SUMMARY

In some implementations, a system includes a sensor system, of an idler assembly of an undercarriage of a machine, configured to: detect movement of an idler block, of the idler assembly, from a first position to a second position, and generate sensor data indicating the movement of the idler block from the first position to the second position; and a controller configured to: receive the sensor data; determine, based on the sensor data, a distance between the first position and the second position; determine an amount of wear of an idler of the idler assembly based on the distance; and cause the machine to perform an action based on determining the amount of wear.

In some implementations, a method performed by a controller of a machine includes receiving, from a sensor system of the machine, sensor data indicating a movement of an idler block of an idler assembly of an undercarriage of the machine; determining, based on the sensor data, that the idler block has moved from a first position to a second position; determining an amount of wear of an idler of the idler assembly based on the idler block moving from the first position to the second position; determining whether the amount of wear satisfies a wear threshold; and causing the machine to perform an action based on determining whether the amount of wear satisfies the wear threshold.

In some implementations, a machine includes an undercarriage assembly; an idler assembly comprising an idler, wear components, and an idler block; a sensor system configured to: generate sensor data indicating a movement of the idler assembly from a first position to a second position; and a controller configured to: receive the sensor data from the sensor system; determine, based on the sensor data, that the idler assembly has moved from the first position to the second position; determine an amount of wear of the idler assembly based on the idler assembly moving from the first position to the second position; determine whether the amount of wear satisfies a wear threshold; and cause the machine to perform an action based on determining whether the amount of wear satisfies the wear threshold.

DETAILED DESCRIPTION

Figure 1:
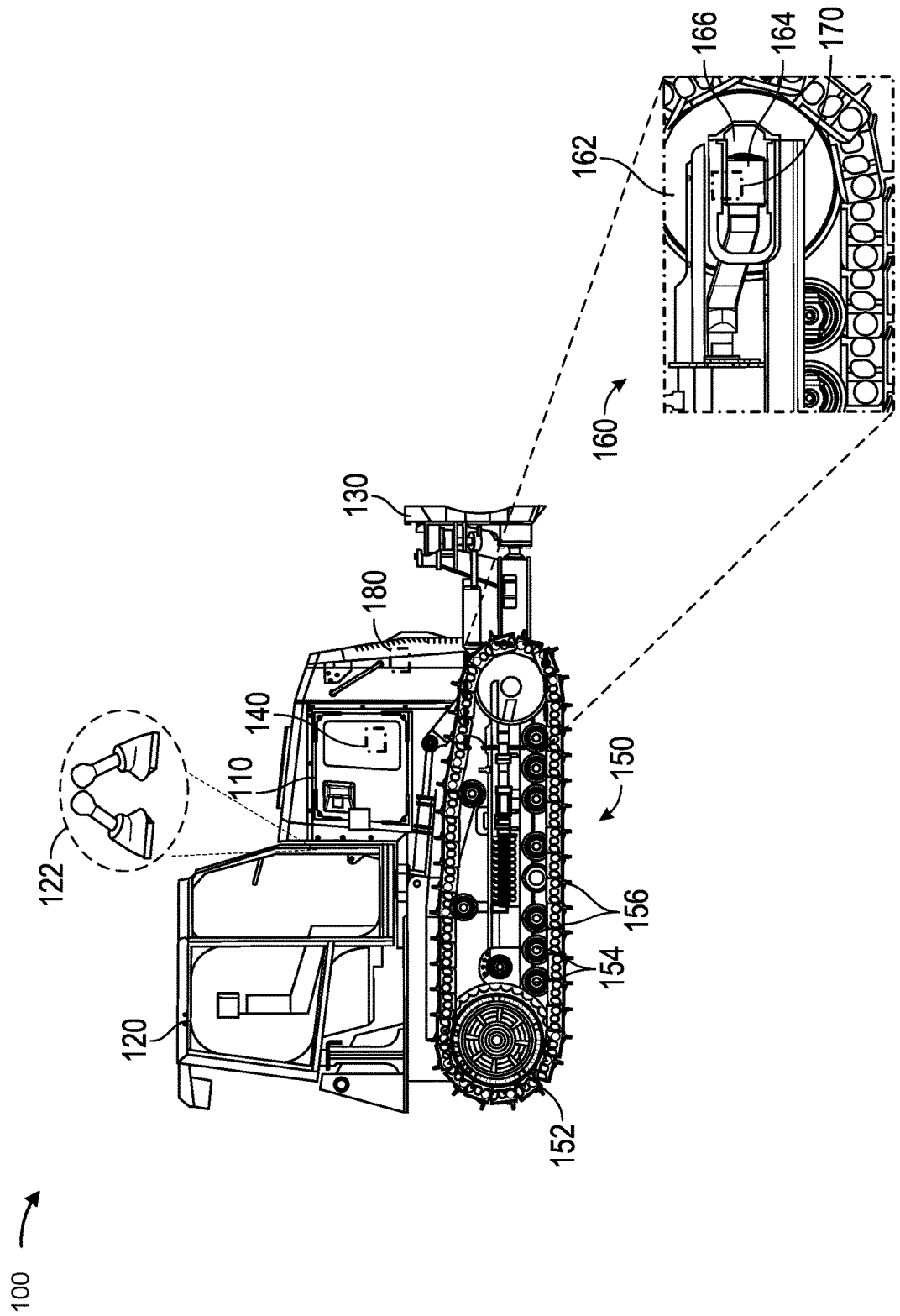
FIG. 1 is a diagram of an example machine described herein.

Implementations described herein are directed to determining an amount of wear of an idler assembly of an undercarriage assembly of a machine. Typically, as an idler (of the idler assembly) experiences wear, an idler block (of the idler assembly) is moved to maintain an amount of tension, of the undercarriage assembly, at an operating level. In this regard, implementations described herein are directed to determining an amount of wear of the idler (and/or of the idler assembly) based on movements of the idler block to adjust the amount of tension. The idler block may be moved along a wear component of the idler assembly.

A sensor system may be used to determine a distance associated with movements of the idler block along the wear component. For example, the sensor system may be used to determine a distance between a current position of the idler block and a prior position of the idler block. The distance may be used to determine the amount of wear of the idler. The sensor system may be provided in a wear component of the idler assembly and/or in the idler block.

In some implementations, the sensor system may include one or more proximity sensor devices. The one or more proximity sensor devices may be provided in the wear component of the idler assembly. Alternatively to the one or more proximity sensor devices, the sensor system may include one or more magnetic components and a magnetic detection component. As an example, the magnetic detection component may be a Hall effect sensor device. The one or more magnetic components may be provided in the wear component and the magnetic detection component may be provided in the idler block.

Alternatively to the one or more magnetic components and the magnetic detection component, the sensor system may include one or more switch components and a magnetic component. As an example, the one or more switch components may be electromechanical switches operated by a magnetic field, such as reed switches. The magnetic field may be generated by the magnetic component. The one or more switch components may be provided in the wear component and the magnetic component may be provided in the idler block.

In some examples, the sensor system may generate sensor data indicating the movement of the idler block from a first position (e.g., the prior position) to a second position (e.g., the current position). A controller may receive the sensor data and determine a distance value of a distance between the first position and the second position. The controller may determine an amount of wear of the idler and/or the idler assembly based on the distance value. For example, the controller may perform a mathematical operation on the distance value to determine the amount of wear of the idler.

The controller may determine whether the amount of wear satisfies a wear threshold, and cause the machine to perform an action based on determining whether the amount of wear satisfies the wear threshold. In some situations, the controller may determine whether the amount of wear satisfies multiple wear thresholds. For example, a first wear threshold may indicate that the idler has a sufficient amount of remaining life. A second wear threshold may indicate that the idler is approaching an amount of wear that requires replacement of the idler. A third wear threshold may indicate that the idler is to be replaced (e.g., to prevent an unintended operation of the machine).

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

FIG. 1 is a diagram of an example machine 100 described herein. As shown in FIG. 1, machine 100 is embodied as an earth moving machine, such as a dozer. Alternatively, machine 100 may be another type of track-type machine, such as an excavator.

As shown in FIG. 1, machine 100 includes an engine 110, an operator cabin 120, operator controls 122, a front attachment 130, a controller 140, an undercarriage assembly 150, a sensor system 170, and a wireless communication component 180.

Engine 110 may include an internal combustion engine, such as a compression ignition engine, a spark ignition engine, a laser ignition engine, a plasma ignition engine, and/or the like. Engine 110 provides power to machine 100 and/or a set of loads (e.g., components that absorb power and/or use power to operate) associated with machine 100.

Operator cabin 120 includes an integrated display (not shown) and operator controls 122. Operator controls 122 may include one or more input components (e.g., integrated joysticks, push-buttons, control levers, and/or steering wheels) to control an operation of machine 100. For example, operator controls 122 may be used to control an operation of one or more implements of machine 100 (e.g., front attachment 130) and/or control an operation of undercarriage assembly 150.

For an autonomous machine, operator controls 122 may not be designed for use by an operator and, rather, may be designed to operate independently from an operator. In this case, for example, operator controls 122 may include one or more input components that provide an input signal for use by another component without any operator input.

Front attachment 130 may include a blade assembly. Front attachment 130 may be referred to as an implement of machine 100.

Controller 140 (e.g., an electronic control module (ECM)) may control and/or monitor operations of machine 100. For example, controller 140 may control and/or monitor the operations of machine 100 based on signals from sensor system 170 and/or wireless communication component 180, as described in more detail below.

Undercarriage assembly 150 may be configured to propel machine 100. Undercarriage assembly 150 may include sprocket 152, rollers 154, track links 156, and an idler assembly 160. Sprocket 152 may include one or more sprocket segments. Sprocket 152 may be configured to engage with track links 156 and to drive track links 156. In some examples, rollers 154 and/or idler assembly 160 may guide track links 156 to rotate to propel machine 100.

Idler assembly 160 may include an idler 162, an idler block 164, and one or more wear components 166. In some situations, as idler 162 experiences wear, an amount of tension in undercarriage assembly 150 may decrease. In this regard, idler block 164 may be moved along wear component 166 toward front attachment 130. Moving idler block 164 in this manner may restore the amount of tension to an operational level.

As shown in FIG. 1, idler assembly 160 may include sensor system 170. Sensor system 170 may include components that are capable of generating sensor data indicating a position of idler block 164. The sensor data may be used by controller 140 to determine an amount of wear of idler 162 and/or of idler assembly 160. For example, controller 140 may use the sensor data to determine a distance value of a distance traveled by idler block 164. Controller 140 may use the distance value to determine the amount of wear of idler 162 and/or idler assembly 160.

Wireless communication component 180 may include one or more devices that are capable of communicating with one or more components of machine 100, one or more other machines, and/or one or more devices, as described herein. For example, wireless communication component 180 may receive the sensor data from sensor system 170 and may provide the sensor data to controller 140, to the one or more other machines, and/or to the one or more devices.

Wireless communication component 180 may include a transceiver, a separate transmitter and receiver, and/or an antenna, among other examples. Wireless communication component 180 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples. Additionally, or alternatively, wireless communication component 180 may communicate with the one or more other machines and/or the one or more devices via a network that includes one or more wired and/or wireless networks.

As indicated above, FIG. 1 is provided as an example. Other examples may differ from what is described in connection with FIG. 1.

Figure 2:
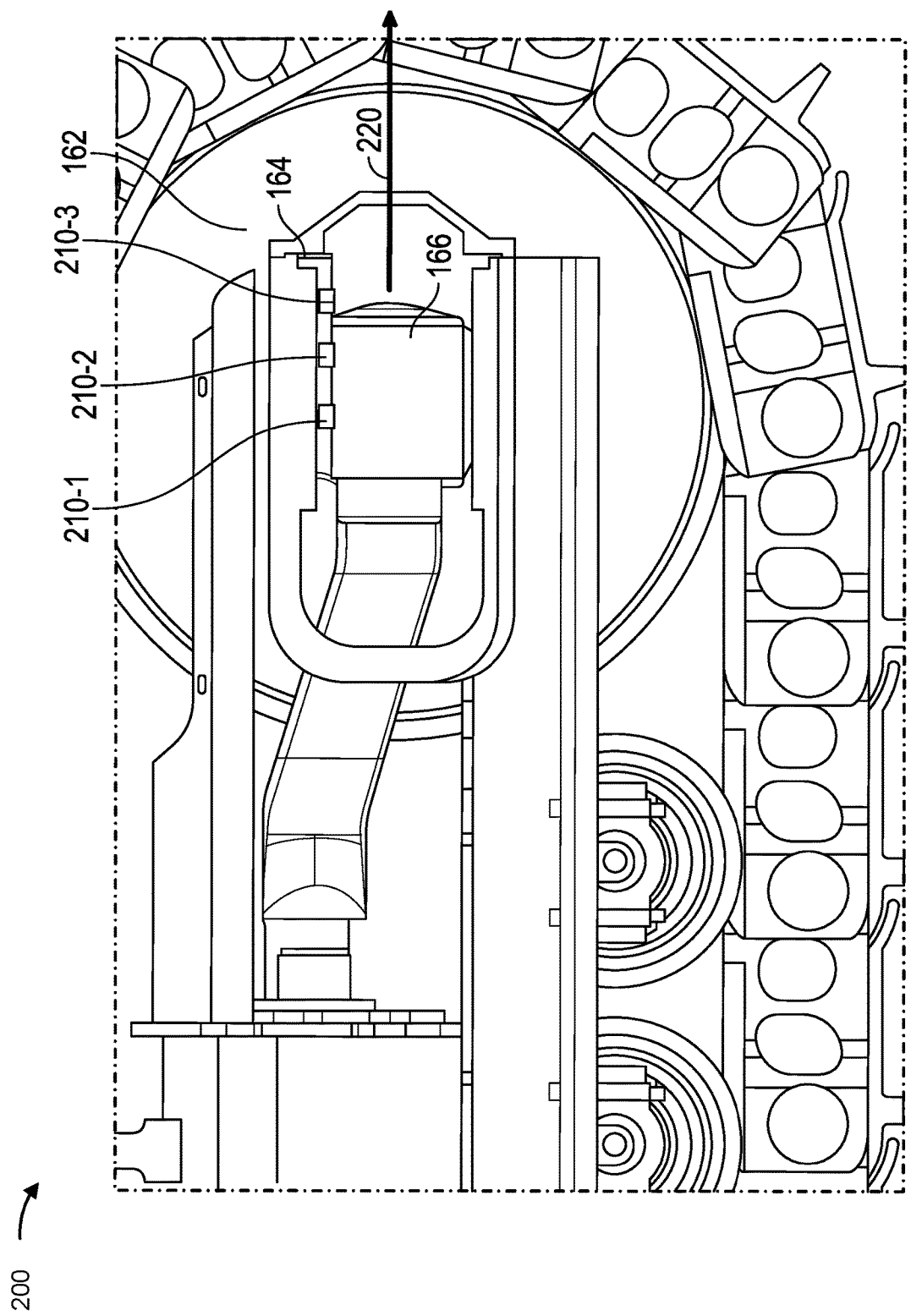
FIG. 2 is a diagram of an example sensor system described herein.

FIG. 2 is a diagram 200 of an example sensor system 170 described herein. Sensor system 170 may include one or more proximity sensor devices. As shown in FIG. 2, sensor system 170 may include a first proximity sensor device 210-1, a second proximity sensor device 210-2, and a third proximity sensor device 210-3 (collectively "proximity sensor devices 210" and individually "proximity sensor device 210"). Proximity sensor devices 210 may be configured to generate sensor data based on detecting a presence of idler block 164 as idler block 164 moves along wear component 166 (e.g., in a direction identified by an arrow 220 in FIG. 2).

As an example, first proximity sensor device 210-1 may generate sensor data and provide the sensor data to controller 140. The sensor data may indicate (e.g., to controller 140) that first proximity sensor device 210-1 has detected the presence of idler block 164. In some situations, the sensor data may include sensor information identifying first proximity sensor device 210-1.

The sensor information may include a serial number of first proximity sensor device 210-1 and/or a media access control (MAC) address associated with first proximity sensor device 210-1, among other examples of information that may uniquely identify first proximity sensor device 210-1. Based on the sensor information, controller 140 may determine a location of first proximity sensor device 210-1. For example, a memory (associated with controller 140) may store sensor location information identifying locations of proximity sensor devices 210.

For instance, a data structure may store the sensor location information (identifying the locations of proximity sensor devices 210) in association with the sensor information identifying proximity sensor devices 210. The data structure may store order information indicating an order in which proximity sensor devices 210 are provided in wear component 166. The order information may include the sensor information identifying proximity sensor devices 210.

Controller 140 may determine the location of first proximity sensor device 210-1 by performing a lookup of the data structure using the sensor information of first proximity sensor device 210-1. Based on the location of first proximity sensor device 210-1, controller 140 may determine a position of idler block 164 (e.g., a position corresponding to the location of first proximity sensor device 210-1). In some examples, controller 140 may determine the position of idler block 164 if controller 140 has not received additional sensor data within a particular amount of time after receiving the sensor data of first proximity sensor device 210-1. In some situations, the sensor information of first proximity sensor device 210-1 may identify a location of first proximity sensor device 210-1.

In some implementations, based on determining the location of first proximity sensor device 210-1, controller 140 may determine whether first proximity sensor device 210-1 is preceded by a preceding proximity sensor device 210. For example, based on the order information stored in the data structure, controller 140 may determine whether first proximity sensor device 210-1 is preceded by a preceding proximity sensor device 210.

If controller 140 determines that first proximity sensor device 210-1 is preceded by a preceding proximity sensor device 210, controller 140 may determine a location of the preceding proximity sensor device 210, in a manner similar to the manner described in connection with proximity sensor device 210-1. Controller 140 may determine a distance value of a distance between a first position of idler block 164 (corresponding to the location of first proximity sensor device 210-1) and a second position of idler block 164 (corresponding to the location of the preceding proximity sensor device 210). The first position may be a prior position of idler block 164 and the second position may be a current position of idler block 164. Controller 140 may determine an amount of wear of idler 162 (and/or of idler assembly 160) based on the distance value.

Other proximity sensor devices 210 may provide sensor data, and controller 140 may use the sensor data in a manner similar to the manner described above in connection with first proximity sensor device 210-1.

As shown in FIG. 2, proximity sensor devices 210 may be provided at different locations in wear component 166. In some examples, the different locations may identify different amounts of wear of idler 162 (and/or idler assembly 160). For example, a first location of first proximity sensor device 210-1 may identify a first amount of wear, a second location of proximity sensor device 210-2 may identify a second amount of wear, and so on. Accordingly, controller 140 may determine the amount of wear of idler 162 (and/or idler assembly 160) based on the different locations of proximity sensor devices 210 (which correspond to different positions of idler block 164).

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example component may perform one or more functions described as being performed by another set of devices of the example component.

Figure 3:
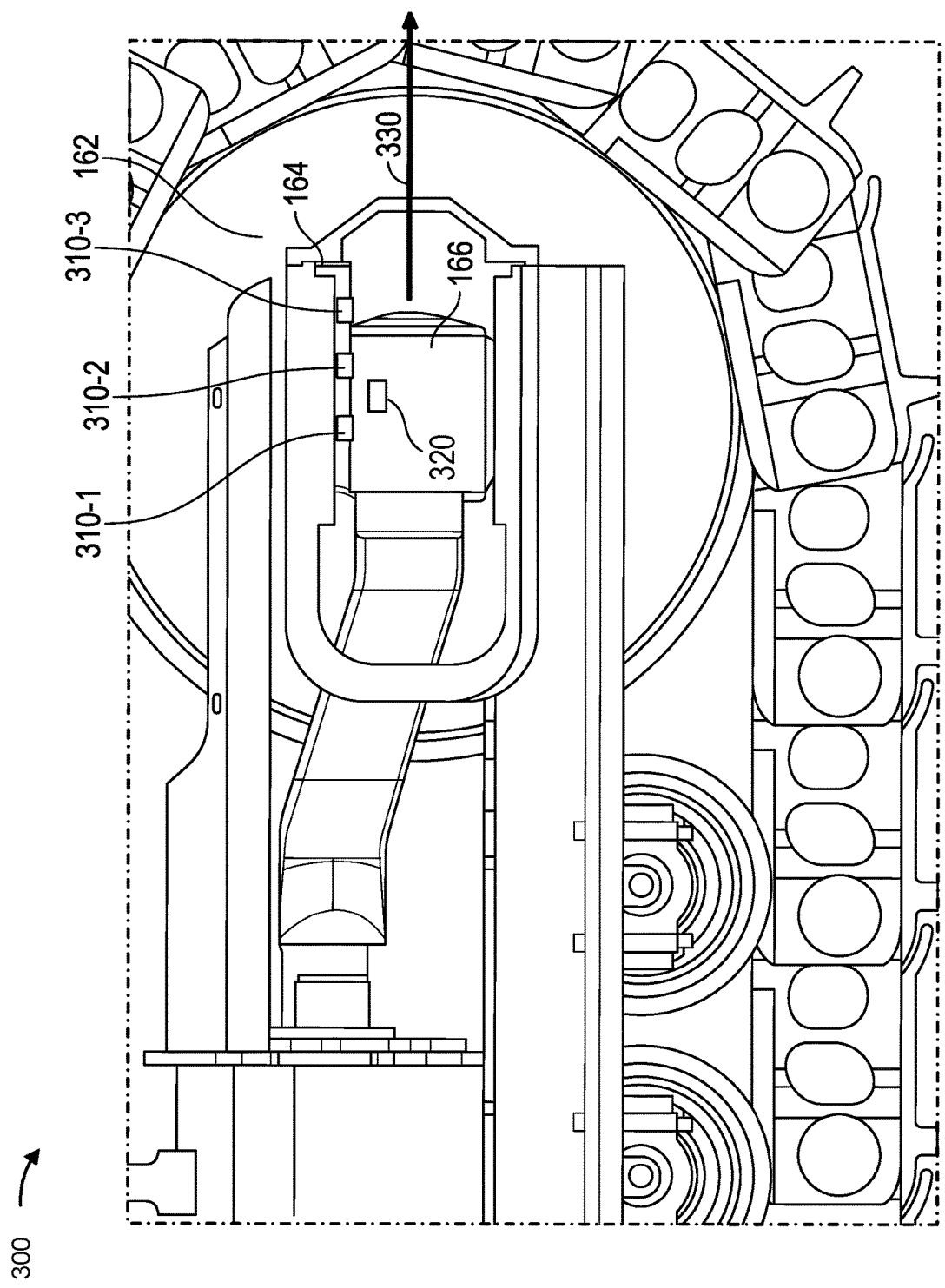
FIG. 3 is a diagram of an example sensor system described herein.

FIG. 3 is a diagram 300 of an example sensor system 170 described herein. Sensor system 170 may include one or more proximity sensor devices. As shown in FIG. 3, sensor system 170 may include a first magnetic component 310-1, a second magnetic component 310-2, and a third magnetic component 310-3 (collectively "magnetic components 310" and individually "magnetic component 310"). Magnetic components 310 may include magnets and/or electromagnets, among other examples of components that generate magnetic fields. Magnetic components 310 may be provided in wear component 166.

As shown in FIG. 3, sensor system 170 may further include a magnetic detection component 320. Magnetic detection component 320 may be configured to detect a magnetic field generated by a magnetic component 310 and generate sensor data indicating that the magnetic field has been detected. As an example, magnetic detection component 320 may be a Hall effect sensor device (e.g., a sensor device that detects a presence and magnitude of a magnetic field using the Hall effect). Magnetic detection component 320 may be provided in idler block 164.

Magnetic detection component 320 may be configured to generate sensor data based on detecting presence and magnitudes of magnetic fields of magnetic components 310 as idler block 164 moves along wear component 166 (e.g., in a direction identified by an arrow 330 in FIG. 3). For instance, magnetic detection component 320 may detect a first magnetic field generated by first magnetic component 310-1 and generate first sensor data indicating that the first magnetic field has been detected, detect a second magnetic field generated by second magnetic component 310-2 and generate second sensor data indicating that the second magnetic field has been detected, and so on.

Magnetic detection component 320 may provide the first sensor data to controller 140, may subsequently provide the second sensor data to controller 140, and so on. In some examples, the first sensor data may include first sequence information indicating that the first sensor data is generated based on a magnetic field that is first detected by magnetic detection component 320, the second sensor data may include second sequence information indicating that the second sensor data is generated based on a magnetic field that is subsequently detected by magnetic detection component 320, and so on.

Accordingly, controller 140 may determine locations of magnetic components 310 based on an order in which the sensor data was received from magnetic detection component 320 and/or based on the sequence information included in the sensor data. In some implementations, controller 140 may obtain order information indicating an order in which magnetic components 310 are provided in wear component 166. The order information may further indicate locations of magnetic components 310 in wear component 166. The order information may be stored in a data structure of a memory associated with controller 140.

Based on receiving the first sensor data prior to any other sensor data and/or based on the first sensor data including the first sequence information, controller 140 may use the order information to determine that the first sensor data was generated based on detecting the first magnetic field of first magnetic component 310-1. Controller 140 may determine the location of first magnetic component 310-1 using the order information. The order information may indicate that first magnetic component 310-1 is provided first in wear component 166. Controller 140 may determine the locations of other magnetic component 310 based on sensor data associated with the other magnetic components 310 in a similar manner. Controller 140 may determine the amount of wear of idler 162 based on the locations of magnetic components 310 in a manner similar to the manner described above in connection with FIG. 2 and proximity sensor devices 210.

While the foregoing example has been described with respect to magnetic components 310 and magnetic detection component 320 being provided in particular portions of idler assembly 160, in some examples, magnetic components 310 and magnetic detection component 320 may be provided in different portions. For example, magnetic components 310 may be provided in idler block 164 and magnetic detection component 320 may be provided in wear component 166.

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example component may perform one or more functions described as being performed by another set of devices of the example component.

Figure 4:
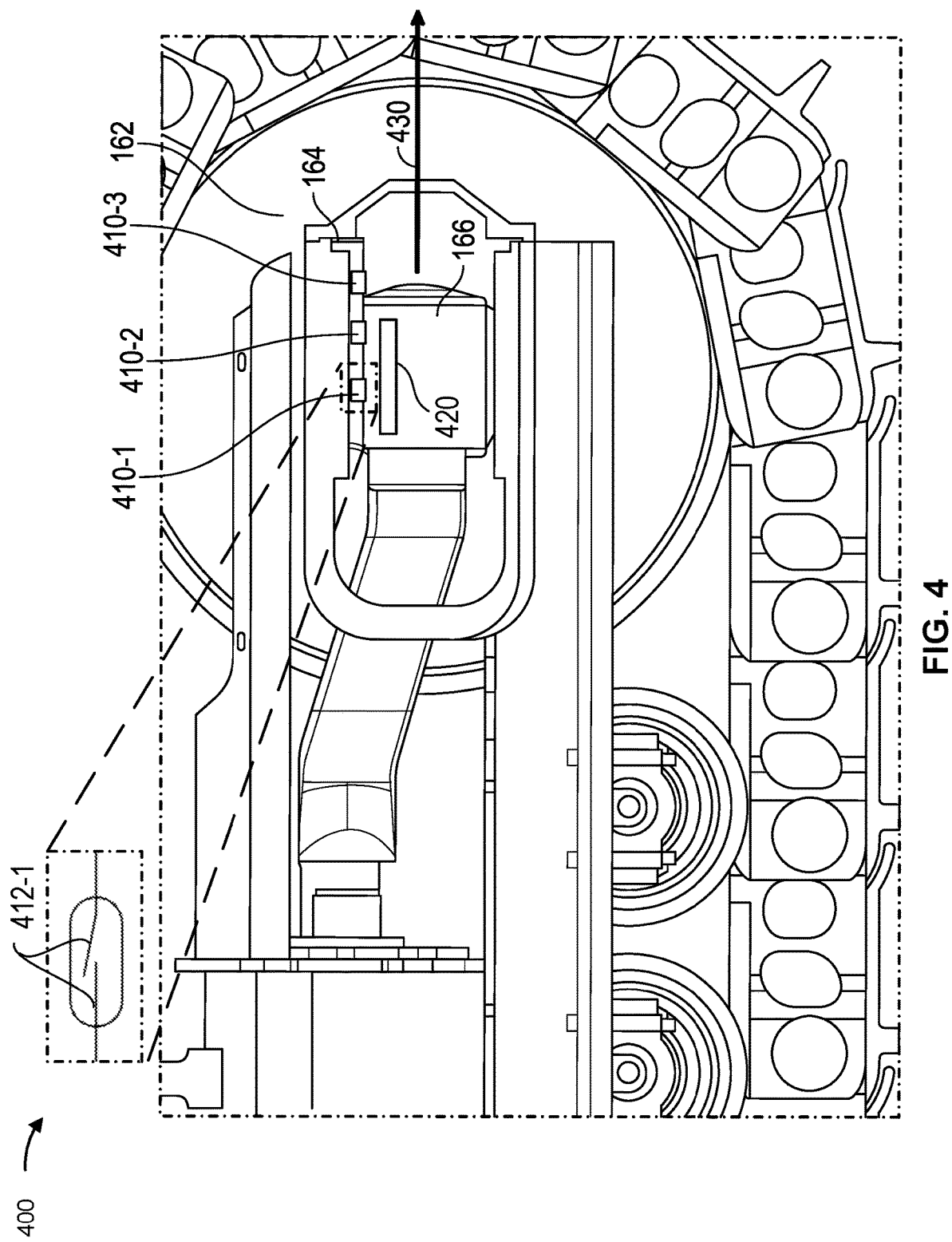
FIG. 4 is a diagram of an example sensor system described herein.

FIG. 4 is a diagram 400 of an example sensor system 170 described herein. Sensor system 170 may include one or more switch components. As shown in FIG. 4, sensor system 170 may include a first switch component 410-1, a second switch component 410-2, and a third switch component 410-3 (collectively "switch components 410" and individually "switch component 410"). Switch components 410 may be provided in wear component 166.

In some examples, a switch component 410 may be an electromechanical switch that is actuated based on a magnetic field. As shown in FIG. 4, for example, first switch component 410-1 may include a pair of metal contacts 412-1. The pair of metal contacts 412-1 may be open in an initial state and may be closed when a magnetic field is present (e.g., when a magnetic field is applied). After the pair of metal contacts 412-1 are closed, first switch component 410-1 may generate sensor data.

As shown in FIG. 4, sensor system 170 may further include a switch magnetic component 420. Switch magnetic component 420 may be a magnet (e.g., switch magnetic component 420 may generate a magnetic field). In some examples, switch magnetic component 420 may be elongated to enable the magnetic field to be continuously applied to switch components 410 to maintain the pairs of metal contact in a closed position. For example, the elongated shape of switch magnetic component 420 may enable the magnetic field to be applied to first switch component 410-1 after idler 162 has moved past switch component 410-1, enable the magnetic field to be applied to first switch component 410-1 and second switch component 410-2 after idler 162 has moved past first switch component 410-1 and second switch component 410-2, and so on.

Switch components 410 may be configured to generate sensor data based on detecting a presence of idler block 164 as idler block 164 moves along wear component 166 (e.g., in a direction identified by an arrow 430 in FIG. 4). Switch components 410 may generate the sensor data and provide the sensor data to controller 140 in a manner similar to the manner described above in connection with FIG. 2. As an example, first proximity sensor device 210-1 may generate sensor data and provide the sensor data to controller 140. The sensor data may indicate (e.g., to controller 140) that first switch component 410-1 has detected the presence of idler block 164 based on detecting the magnetic field of witch magnetic component 420.

In some situations, the sensor data may include sensor information identifying first proximity sensor device 210-1. Controller 140 may receive the sensor data, determine the locations of switch components 410, and determine the amount of wear of idler 162 (and/or of idler assembly 160) in a manner similar to the manner described above in connection with FIG. 2.

While the foregoing example has been described with respect to switch components 410 and switch magnetic component 420 being provided in particular portions of idler assembly 160, in some examples, switch components 410 and switch magnetic component 420 may be provided in different portions of idler assembly 160.

The number and arrangement of devices shown in FIG. 4 are provided as an example. In practice, there may be additional devices, fewer devices, different devices, or differently arranged devices than those shown in FIG. 4.

Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the example component may perform one or more functions described as being performed by another set of devices of the example component.

Figure 5:
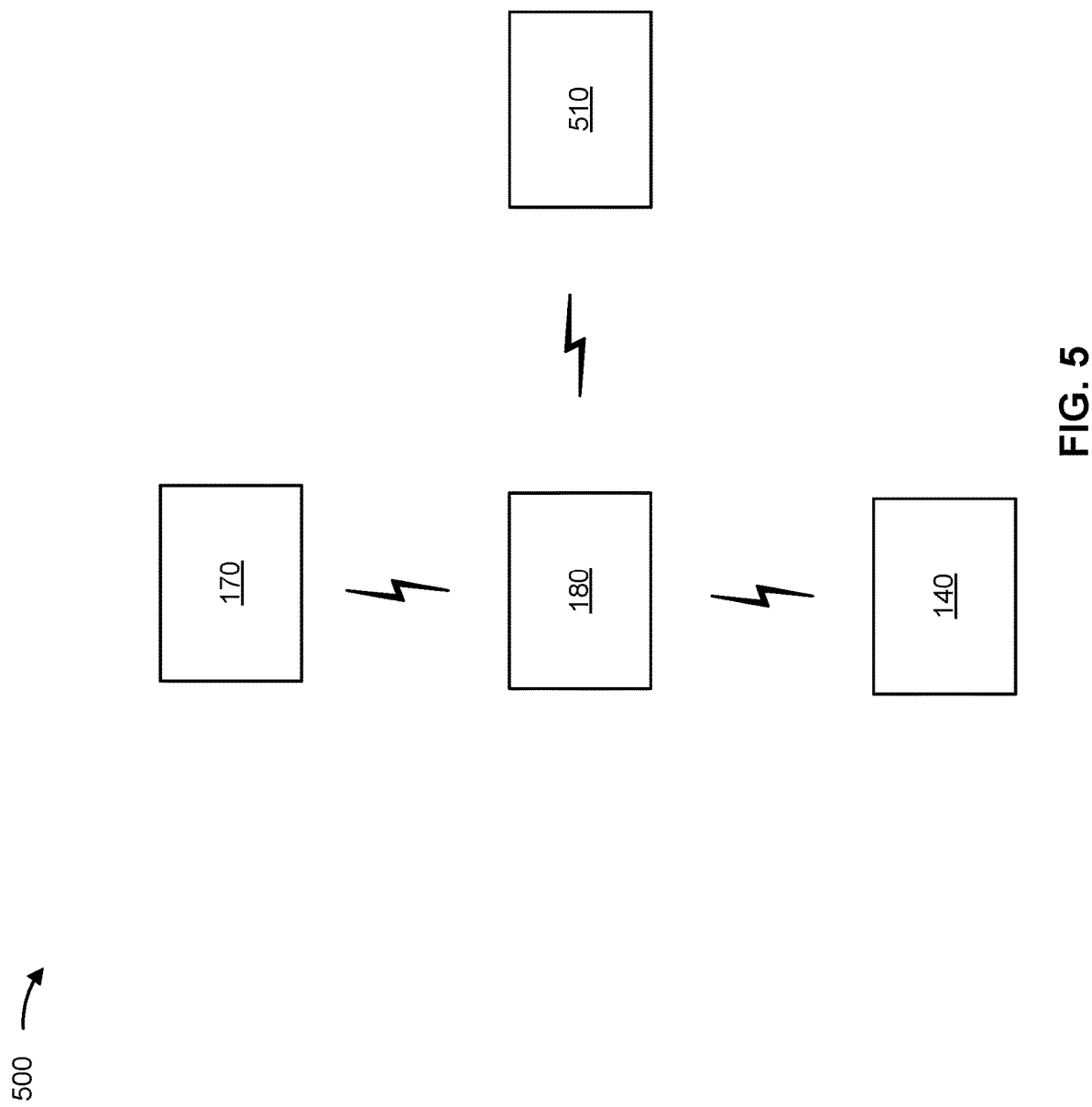
FIG. 5 is a diagram of an example system described herein.

FIG. 5 is a diagram of an example system 500 described herein. As shown in FIG. 5, system 500 includes controller 140, sensor system 170, wireless communication component 180, and a device 510 associated with machine 100. Some of the elements of FIG. 5 have been described above in connection with FIGS. 1-4.

Controller 140 may include one or more processors and one or more memories. A processor may be implemented in hardware, firmware, and/or a combination of hardware and software. A processor may be capable of being programmed to perform a function.

A memory may store information and/or instructions for use by a processor to perform the function. In some examples, the memory may store sensor location information identifying locations of components of sensor system 170 in wear component 166. Additionally, the memory may store order information indicating an order in which components of sensor system 170 are provided in wear component 166. The sensor location information and the order information may be used to determine positions of idler block 164, as explained herein.

In some situations, when performing the function, controller 140 may control an operation of machine 100 based on the sensor data provided by sensor system 170. For instance, controller 140 may determine an amount of wear of idler 162 (and/or of idler assembly 160) based on sensor data from sensory system 170. Based on the amount of wear, controller 140 may control the operation of machine 100.

Device 510 may include a display included in operator cabin 120. Additionally, or alternatively, device 510 may include a user device of an operator of machine 100, a user device of a site manager associated with machine 100, and/or a user device of an owner of machine 100. Additionally, or alternatively, device 510 may include a back office system (e.g., that monitors an operation of machine 100).

In some examples, controller 140 may receive the sensor data provided by sensor system 170. Controller 140 may receive the sensor data from sensor system 170. Alternatively, sensor system 170 may provide the sensor data to wireless communication component 180 and wireless communication component 180 may provide the sensor data to controller 140. In some examples, wireless communication component 180 may provide the sensor data to device 510.

Sensor system 170 may generate the sensor data in a manner similar to the manner described above in connection with FIGS. 2-4. Controller 140 may determine the locations of components of sensor system 170 and determine positions of idler block 164 based on the locations in a manner similar to the manner described above in connection with FIGS. 2-4.

Controller 140 may determine a distance value of a distance between a current position of idler block 164 and a prior position of idler block 164 in a manner similar to the manner described above in connection with FIGS. 2-4. Controller 140 may determine the amount of wear of idler 162 (and/or of idler assembly 160) based on the distance value. In some situations, controller 140 may perform a mathematical operation using the distance value to determine the amount of wear. For example, controller 140 may perform a mathematical operation using the distance value and a factor. For instance, controller 140 may multiply the distance value by the factor, controller 140 may divide the distance value by the factor, among other examples.

In some instances, the factor may be based on a dimension of idler 162 and/or based on dimensions of other components of idler assembly 160. For example, the factor may be based on a diameter of idler 162, based on a thickness of idler 162, and/or based on a length of idler block 164, among other examples.

Controller 140 may compare the amount of wear and a wear threshold to determine whether the amount of wear satisfies the wear threshold. In some instances, controller 140 may compare the distance value and a distance threshold. Controller 140 may determine that the amount of wear satisfies the wear threshold based on determining that the distance value satisfies the distance threshold.

In some examples, controller 140 may cause machine 100 to perform the action based on determining whether the amount of wear satisfies the wear threshold. For instance, controller 140 may provide a notification to device 510. As an example, controller 140 may provide the notification to wireless communication component 180, and wireless communication component 180 may provide the notification to device 510. The notification may provide information identifying the amount of wear.

In some situations, based on determining that the amount of wear satisfies the wear threshold, the notification may include information indicating that idler 162 (and/or idler assembly 160) will be experiencing a failure and a recommendation to replace idler 162 (and/or idler assembly 160). In some implementations, controller 140 may predict a time to failure based on information regarding a current utilization of machine 100, information regarding historical utilization of machine 100, information regarding an age of idler 162 (and/or idler assembly 160), and/or information regarding a date of installation of idler 162 (and/or idler assembly 160), among other examples.

In some situations, when causing machine 100 to perform the action, controller 140 may provide a command to restrict an operation of machine 100 based on determining that the amount of wear satisfies the wear threshold. For example, controller 140 may provide a command to derate engine 110. For instance, controller 140 may provide the command to an engine controller associated with engine 110 to cause engine 110 to be derated.

In some examples, the different locations of the components of sensor system 170 may identify different wear thresholds. For example, a first location of first proximity sensor device 210-1 may identify a first wear threshold, a second location of proximity sensor device 210-2 may identify a second wear threshold, and so on. The first wear threshold may indicate that idler 162 (and/or idler assembly 160) has a sufficient amount of remaining life. The second wear threshold may indicate that idler 162 (and/or idler assembly 160) is approaching an amount of wear that requires replacement of the idler. The third wear threshold may indicate that idler 162 (and/or idler assembly 160) is to be replaced (e.g., to prevent an unintended operation of the machine).

Accordingly, controller 140 may cause machine 100 to perform different actions based on the different wear thresholds. For example, based on the first location, controller 140 may provide a notification that idler 162 (and/or idler assembly 160) has a sufficient amount of remaining life. Based on the second location, controller 140 may provide a first recommendation to service idler 162 (and/or idler assembly 160). Based on the third location, controller 140 may provide a second recommendation to replace idler 162 (and/or idler assembly 160).

The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of the example component may perform one or more functions described as being performed by another set of devices of the example component.

Figure 6:
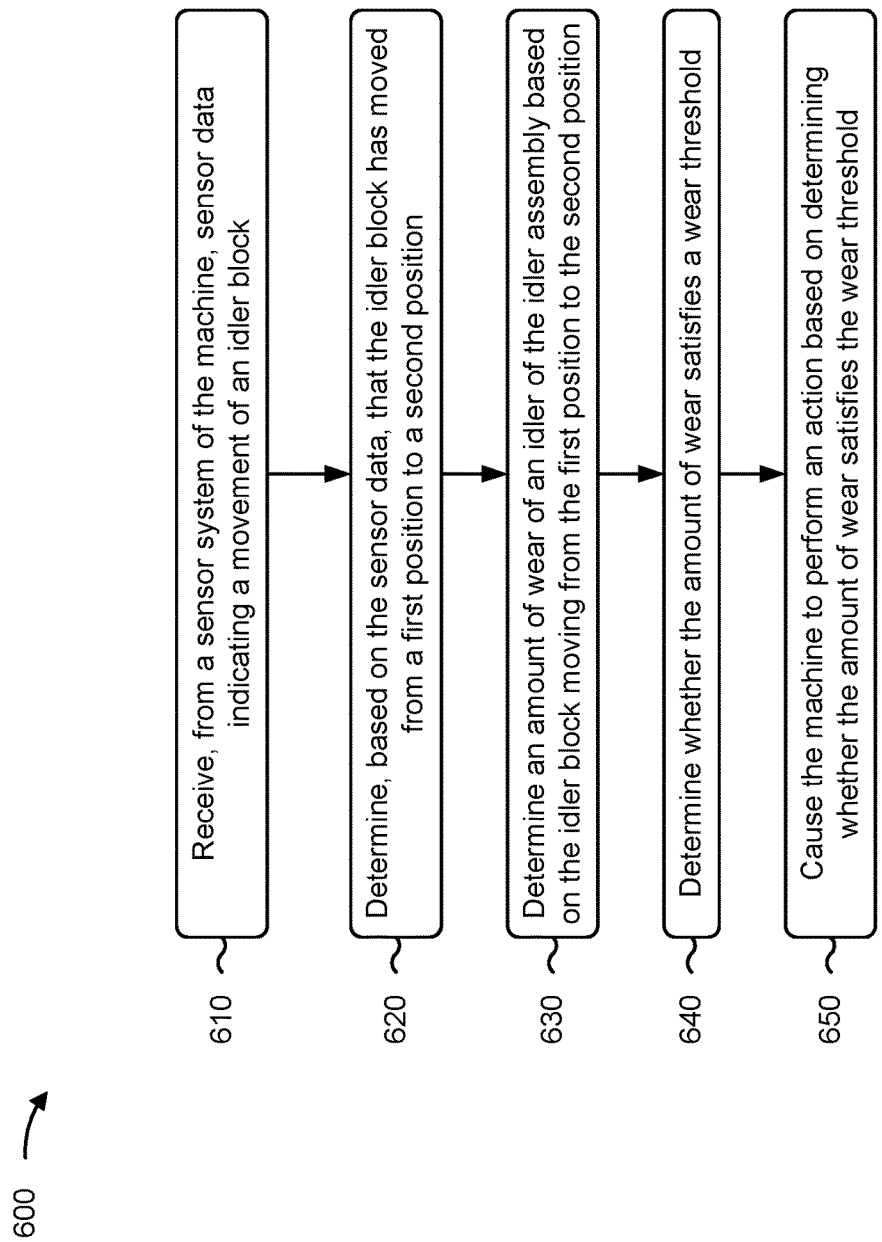
FIG. 6 is a flowchart of an example processes relating to determining wear of an idler.

FIG. 6 is a flowchart of an example process 600 relating to determining wear of an idler. In some implementations, one or more process blocks of FIG. 6 may be performed by a controller (e.g., controller 140). In some implementations, one or more process blocks of FIG. 6 may be performed by another device or a group of devices separate from or including the controller, such as a sensor system (e.g., sensor system 170), a wireless communication component (e.g., wireless communication component 180), and/or a device (e.g., device 510).

As shown in FIG. 6, process 600 may include receiving, from a sensor system of the machine, sensor data indicating a movement of an idler block of an idler assembly of an undercarriage of the machine (block 610). For example, the controller may receive, from a sensor system of the machine, sensor data indicating a movement of an idler block of an idler assembly of an undercarriage of the machine, as described above.

As further shown in FIG. 6, process 600 may include determining, based on the sensor data, that the idler block has moved from a first position to a second position (block 620). For example, the controller may determine, based on the sensor data, that the idler block has moved from a first position to a second position, as described above.

As further shown in FIG. 6, process 600 may include determining an amount of wear of an idler of the idler assembly based on the idler block moving from the first position to the second position (block 630). For example, the controller may determine an amount of wear of an idler of the idler assembly based on the idler block moving from the first position to the second position, as described above.

As further shown in FIG. 6, process 600 may include determining whether the amount of wear satisfies a wear threshold (block 640). For example, the controller may determine whether the amount of wear satisfies a wear threshold, as described above.

As further shown in FIG. 6, process 600 may include causing the machine to perform an action based on determining whether the amount of wear satisfies the wear threshold (block 650). For example, the controller may cause the machine to perform an action based on determining whether the amount of wear satisfies the wear threshold, as described above.

In some implementations, the idler assembly includes a wear component. The movement of the idler block is a movement, along the wear component, from the first position to the second position.

In some implementations, process 600 includes determining a distance between the first position and the second position, and determining the amount of wear based on the distance.

In some implementations, process 600 includes determining that the amount of wear satisfies the wear threshold based on the distance, causing the machine to perform the action comprises providing a notification regarding the amount of wear based on determining that the amount of wear satisfies the wear threshold, and the notification indicates that the idler assembly is to be replaced based on determining that the amount of wear satisfies the wear threshold.

In some implementations, process 600 includes determining that the distance satisfies a distance threshold, and determining that the amount of wear satisfies the wear threshold based on determining that the distance satisfies the distance threshold.

In some implementations, the sensor system includes a proximity sensor device, wherein the proximity sensor device is provided in a wear component of the idler assembly at a location corresponding to the second position, and wherein receiving the sensor data comprises receiving the sensor data based on the proximity sensor device detecting a presence of the idler block at the location.

In some implementations, the sensor system includes a magnetic component and a magnetic detection component, wherein the magnetic component is provided in a wear component of the idler assembly at a location corresponding to the second position, wherein the magnetic detection component is provided in the idler block, and wherein receiving the sensor data comprises receiving the sensor data based on the magnetic detection component detecting a magnetic field generated by the magnetic component.

In some implementations, the sensor system includes a switch component and a switch magnetic component. The switch component is provided, in a wear component of the idler assembly, at a location corresponding to the second position. The switch magnetic component is provided in the idler block. The switch component is configured to generate the sensor data based on detecting a magnetic field generated by the switch magnetic component Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

Implementations described herein are directed to determining an amount of wear of an idler assembly of an undercarriage assembly of a machine. Typically, as an idler (of the idler assembly) experiences wear, an idler block (of the idler assembly) is moved to maintain an amount of tension, of the undercarriage assembly, at an operating level. In this regard, implementations described herein are directed to determining an amount of wear of the idler (and/or of the idler assembly) based on movements of the idler block to adjust the amount of tension. The idler block may be moved along a wear component of the idler assembly.

Implementations described herein are directed to providing components of a sensor system in wear components of the idler assembly and in the idler block. Providing the components in this manner reduces obstruction to signals (e.g., sensor data) provided by the components. Additionally, providing the components in this manner enables the sensor system to be retro-fit with the machine without extensive removal and re-configuration of large components of the machine.

Determining the amount of wear based on the distance (and/or based on positions of the components of the sensor system) provides several advantages. For example, determining the amount of wear as described herein consumes shorter amounts of time than amounts of time consumed by manually measuring the amount of wear of the idler. Moreover, determining the amount of wear as described herein is less expensive than manually measuring the amount of wear of the idler. Additionally, determining the amount of wear as described herein reduces (or eliminates) inaccuracies that may result from manually measuring the amount of wear of the idler.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
   a sensor system, of an idler assembly of an undercarriage of a machine, configured to:
      detect movement of an idler block, of the idler assembly, in a lateral direction from a first position to a second position that is closer to a track link, of the undercarriage, along the lateral direction than the first position, and
      generate sensor data indicating the movement of the idler block in the lateral direction from the first position to the second position that is closer to the track link along the lateral direction than the first position; and
   a controller configured to:
      receive the sensor data;
      determine an amount of wear of an idler of the idler assembly based on the sensor data indicating the movement of the idler block in the lateral direction from the first position to the second position that is closer to the track link along the lateral direction than the first position; and
      cause the machine to perform an action based on determining the amount of wear.

2. The system of claim 1, wherein the sensor system includes a proximity sensor device,
   wherein the proximity sensor device is provided in a wear component of the idler assembly at a location corresponding to the second position, and
   wherein the proximity sensor device is configured to generate the sensor data based on detecting a presence of the idler block at the location.

3. The system of claim 1, wherein the sensor system includes magnetic components and a magnetic detection component,
   wherein the magnetic components are provided in a first portion of the idler assembly at different locations of the first portion,
   wherein the magnetic detection component is provided in a second portion of the idler assembly, and
   wherein the magnetic detection component is configured to generate the sensor data based on detecting a magnetic field generated by a particular magnetic component of the magnetic components.

4. The system of claim 1, wherein the sensor system includes a switch component and a switch magnetic component,
   wherein the switch component is provided, in a wear component of the idler assembly, at a location corresponding to the second position,
   wherein the switch magnetic component is provided in the idler block, and
   wherein the switch component is configured to generate the sensor data based on detecting a magnetic field generated by the switch magnetic component.

5. The system of claim 1, wherein the controller is configured to:
   determine whether a distance, between the first position and the second position, satisfies a distance threshold; and
   determine whether the amount of wear satisfies a wear threshold based on determining whether the distance satisfies the distance threshold.

6. The system of claim 5, wherein the controller is configured to:
   determine that the distance satisfies the distance threshold; and
   determine that the amount of wear satisfies the wear threshold based on determining that the distance satisfies the distance threshold.

7. The system of claim 1, wherein, to cause the machine to perform the action, the controller is configured to:
   provide a notification indicating the amount of wear.

8. The system of claim 1, wherein the sensor system includes a first component and a second component, and
   wherein the first component is provided in a wear component of the idler assembly,
   wherein the second component is provided in the idler block.

9. The system of claim 8, wherein the first component is at a location corresponding to the second position.

10. The system of claim 8, wherein the first component is configured to generate the sensor data based on detecting a magnetic field generated by the second component.

11. A method performed by a controller of a machine, the method comprising:

receiving, from a sensor system of the machine, sensor data indicating a movement of an idler block, of an idler assembly of an undercarriage of the machine;

determining, based on the sensor data, that the idler block has moved in a lateral direction from a first position to a second position that is closer to a track link, of the undercarriage, along the lateral direction than the first position;

determining an amount of wear of an idler of the idler assembly based on the idler block moving in the lateral direction from the first position to the second position;

determining whether the amount of wear satisfies a wear threshold; and causing the machine to perform an action based on determining whether the amount of wear satisfies the wear threshold.

12. The method of claim 11, wherein the idler assembly includes a wear component, and
wherein the movement of the idler block is a movement, along the wear component, from the first position to the second position.

13. The method of claim 11, further comprising:
determining a distance between the first position and the second position; and
determining the amount of wear based on the distance.

14. The method of claim 13, further comprising:
determining that the amount of wear satisfies the wear threshold based on the distance; and
wherein causing the machine to perform the action comprises:
providing a notification regarding the amount of wear based on determining that the amount of wear satisfies the wear threshold,
wherein the notification indicates that the idler assembly is to be replaced based on determining that the amount of wear satisfies the wear threshold.

15. The method of claim 14, further comprising:
determining that the distance satisfies a distance threshold; and
determining that the amount of wear satisfies the wear threshold based on determining that the distance satisfies the distance threshold.

16. The method of claim 11, wherein the sensor system includes a proximity sensor device,
wherein the proximity sensor device is provided in a wear component of the idler assembly at a location corresponding to the second position, and
wherein receiving the sensor data comprises:
receiving the sensor data based on the proximity sensor device detecting a presence of the idler block at the location.

17. The method of claim 11, wherein the sensor system includes a magnetic component and a magnetic detection component,
wherein the magnetic component is provided in a first portion of the idler assembly at a location corresponding to the second position,
wherein the magnetic detection component is provided in a second portion of the idler assembly, and
wherein receiving the sensor data comprises:
receiving the sensor data based on the magnetic detection component detecting a magnetic field generated by the magnetic component.

18. A machine, comprising:
an undercarriage assembly;
an idler assembly comprising an idler, one or more wear components, and an idler block;
a sensor system that includes a switch component and a switch magnetic component,
wherein the switch component is provided, in a wear component of the wear components, at a location corresponding to the second position,
wherein the switch magnetic component is provided in the idler block, and
wherein the switch component is configured to:
generate, based on detecting a magnetic field generated by the switch magnetic component, sensor data indicating a movement of the idler assembly from a first position to a second position; and
a controller configured to:
receive the sensor data from the sensor system;
determine, based on the sensor data, that the idler assembly has moved from the first position to the second position;
determine an amount of wear of the idler assembly based on the idler assembly moving from the first position to the second position;
determine whether the amount of wear satisfies a wear threshold; and
cause the machine to perform an action based on determining whether the amount of wear satisfies the wear threshold.

19. The machine of claim 18, wherein the movement of the idler assembly is a movement from the first position to the second position along a wear component of the wear components.

20. The machine of claim 18, wherein the controller is further configured to:
determine a distance between the first position and the second position; and
determine the amount of wear based on the distance.

* * * * *